Oct. 15, 1929.    A. DURESEN    1,731,374
FRONT WHEEL MOUNTING FOR MOTOR VEHICLES
Original Filed May 23, 1925
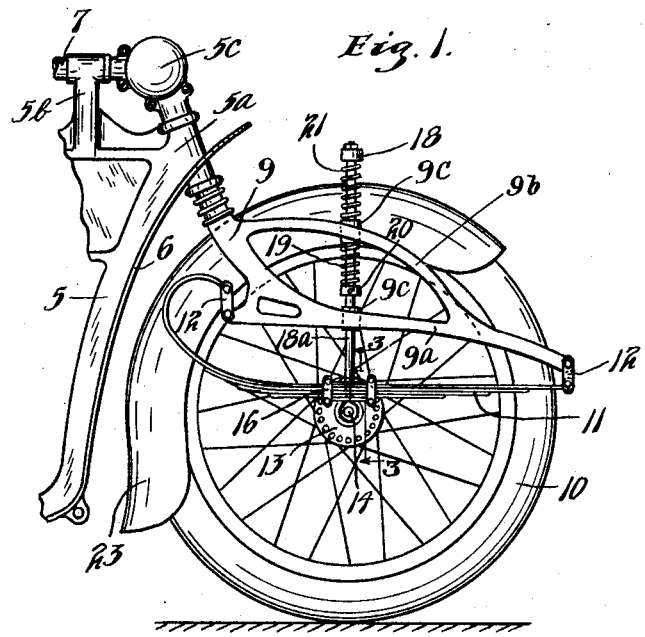
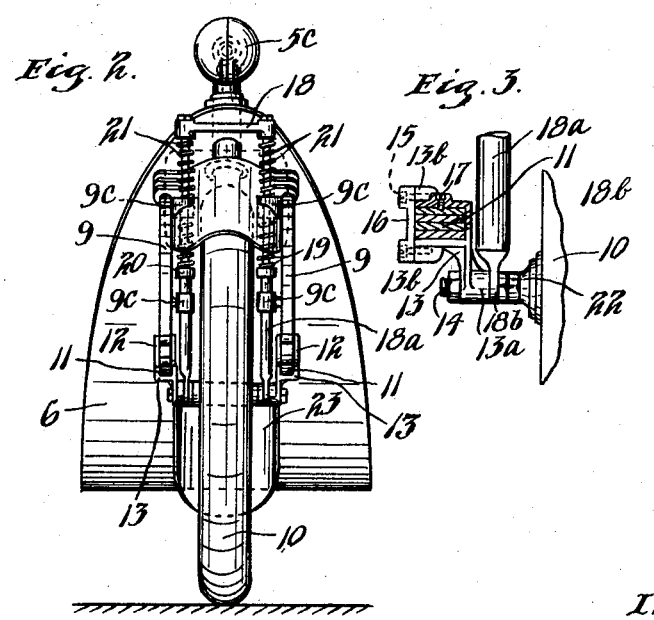
INVENTOR.
ANDREW DURESEN.
BY HIS ATTORNEYS.

Patented Oct. 15, 1929

1,731,374

UNITED STATES PATENT OFFICE

ANDREW DURESEN, OF MINNEAPOLIS, MINNESOTA

FRONT-WHEEL MOUNTING FOR MOTOR VEHICLES

Original application filed May 23, 1925, Serial No. 32,515. Divided and this application filed October 8, 1928. Serial No. 311,035.

This invention relates to a vehicle of the bicycle type and while the invention is applicable to various types of vehicles having a front wheel, it is particularly adapted for use on a motor cycle.

It is desirable in a motorcycle to have the front wheel fork resiliently mounted. It is also desirable to have a fork which can obtain quite an area of spring suspension and it is desirable and practically necessary to have means holding said fork in proper relation relatively to the wheel and guiding the same for vertical movement. It is desirable with such a resiliently mounted fork to have auxiliary supporting springs and shock absorbing springs.

It is an object of this invention, therefore, to provide a front wheel suspension structure for a motorcycle or other vehicle, comprising a fork having forwardly and rearwardly extending portions respectively disposed at the sides of the front wheel, said portions being resiliently connected to the wheel together with guiding means therefor.

It is a further object of the invention to provide a front wheel suspension for a motorcycle or other vehicle comprising a fork having forwardly and rearwardly extending portions disposed respectively at the sides of the front wheel together with an additional or auxiliary fork secured to the front wheel axle forming a guiding means for said first mentioned fork.

It is still another object of the invention to provide a front wheel suspension structure for a motorcycle or other vehicle, comprising, a main fork having portions disposed respectively at either side of the front wheel, said portions extending forwardly and rearwardly and being connected to an upwardly and rearwardly extending steering head on said fork, together with an auxiliary, vertically extending, fork.

It is also an object of the invention to provide a front wheel suspension for a motorcycle or other vehicle comprising, a main fork having forwardly and rearwardly extending portions disposed respectively at the sides of the front wheel, leaf springs having their ends connected respectively to the ends of said portions, together with an additional fork having its lower ends connected respectively to ends of the front wheel axle and having sides guided in said portions, auxiliary supporting and shock absorbing springs being associated with said fork and said portions.

These and other objects and advantages of the invention will be fully set forth in the following description made in connection with the accompanying drawings, in which like reference characters refer to similar parts throughout the several views, and in which:—

Fig. 1 is a view in side elevation of the front portion of a motorcycle having applicant's invention thereon;

Fig. 2 is a view in front elevation of parts shown in Fig. 1, and

Fig. 3 is a vertical section taken substantially on line 3—3 of Fig. 1, as indicated by the arrows.

Referring to the drawing, part of a motorcycle shown comprises the front fork of the frame 5 having a mud-guard 6 secured thereto, said frame 5 having a steering column head $5^a$ at its upper portion and comprising upwardly bearing arms $5^b$ in which are disposed tubes 7 adapted to house the steering shaft. A housing $5^c$ is also shown extending between parts $5^a$ and 7, adapted to house a pair of beveled gears secured respectively to the shaft in tube 7 and to the upper steering post portion of a main fork 9, said beveled gears preferably being of the same size. The main fork 9 has forwardly and rearwardly extending side portions or bars $9^a$ disposed at either side of the front wheel 10. Said fork also comprises the portions or bars $9^b$ connected at either end to said fork or portions $9^a$ and vertically spaced therefrom at their central portions. The portions or bars $9^a$ and 9$^b$ carry lugs 9$^c$ vertically aligned and having vertically aligned apertures or bores therethrough. A multiple leaf spring 11 is provided at each side of the wheel 10, which springs have their ends respectively connected to the ends of bars 9$^a$ by the shackles 12. The central portions of springs 11 are seated in spring brackets 13 having depending apertured lugs 13$^a$ through which pass the ends of the axle 14 of the front wheel 10, nuts being threaded on the ends of the axle and engaging the outer ends of lugs 13$^a$. The brackets 13 also have vertically spaced pairs of lugs 13$^b$, said pairs being disposed forwardly and rearwardly of the axle 14, said lugs being tapped to receive bolts 15 which secure thereto the closing plates or clips 16 which extend between said pairs of lugs, bolts 15 being shown as having their heads counter-sunk in the plates 16. Plates 16 thus are disposed at the outer sides of the springs 11 and hold the same in brackets 13. Small counter-sunk screws 17 extend through lugs in the top of brackets 13 and respectively engage the top leaves of the springs 11.

An additional or auxiliary fork 18 is provided having sides in the form of rods 18$^a$, the lower ends of which are provided with flat apertured lugs 18$^b$ through which pass the ends of the axle 14. The sides 18$^a$ extend vertically through the lugs 9$^c$ and coiled compression springs 19 surround said sides 18$^a$. The ends of said springs engage the bottoms of lugs 9$^c$ and the tops of collars 20, said collars being pinned or otherwise secured to rods 18$^a$. Other coiled springs 21 surround rods 18$^a$ having their lower ends engaging the tops of lugs 9$^c$ respectively and their upper ends engaging the bottom of the top cross bar of fork 18, which extends between and connects with rods 18$^a$. Said rods 18$^a$ pass through lugs on the end of said cross bar and have nuts threaded on their ends which engage said cross bar. The nut 22 is threaded on axle 14 between the lug 18$^b$ and the hub of wheel 10. A mud guard 23 extends over the top and about the rear side of wheel 10, the same being shown as integral with the main fork 9 and connecting with the inner side of said fork.

In operation, when the motorcycle is in operation the weight of the frame will be transmitted to the fork 9 and thence to the leaf springs 11. This weight will also be partly taken by the spring 19. When the springs 11 and 19 are compressed and rebound, the rebound will compress spring 21 so that the same will be checked and springs 21 will thus form shock absorbing springs. The springs 19 and 21 will both function as checks or snubbers for the flexing of spring 11. The shocks transmitted from the frame to the front wheel will thus be effectively taken and absorbed by the springs 11, 19 and 21. The auxiliary fork 18 acts as a guiding means for the fork 9 and insures that the sides of fork 9 will be held in proper position and guided for substantially vertical movement. The spring 11 is effectively secured in bracket 13 and screw 17 prevents any lengthwise shifting of this spring. The whole structure is compact, simple and efficient and will have a high degree of utility for the purpose for which it is intended.

This application is a division of applicant's co-pending application filed May 23, 1925 on motor vehicle, Serial Number 32,515.

It will, of course, be understood that various changes may be made in the form, details, arrangement and proportions of the device without departing from the scope of applicant's invention, which, generally stated, consists in a device capable of carrying out the objects above set forth, such as disclosed and defined in the appended claims.

What is claimed is:

1. In a motorcycle having a front wheel, a front wheel suspension structure comprising a main fork having forwardly and rearwardly extending portions disposed respectively at the sides of the front wheel and a substantially vertically disposed auxiliary fork having side portions cooperating with said portions of said main fork.

2. In a motorcycle having a front wheel, a front wheel structure comprising a main fork having forwardly and rearwardly extending portions disposed at the sides of the front wheel, springs for supporting said portions and means for guiding said main fork vertically during the flexing of said springs.

3. In a motorcycle having a front wheel, a frame, a main fork rotatably mounted in said frame having forwardly and rearwardly extending portions disposed at either side of said wheel, springs connected to the ends of said portions at either side of said wheel, means for guiding said fork when said springs are flexed and reversibly acting auxiliary springs cooperating with said first mentioned springs.

4. In a motorcycle having a front wheel, a frame, a main fork journaled in said frame and having forwardly and rearwardly extending portions disposed respectively at either side of said front wheel, leaf springs shackled to the ends of said portions at either side of said wheel and supporting said fork and auxiliary supporting and shock absorbing springs controlling the movements of said fork.

5. In a motorcycle having a front wheel, a frame, a main fork journaled in said frame and having portions disposed respectively at either side of said front wheel, springs at either side of said wheel supporting said portions from the axle of said wheel and means extending through said portions and connected to said wheel for guiding said main fork during the flexing of said springs.

6. In a motor cycle having a front wheel, a frame, a main fork rotatably mounted on said frame having forwardly and rearwardly extending portions disposed respectively at either side of said front wheel, leaf springs intermediately supported on the axle of said front wheel and shackled at either end to the ends of said portions respectively and a vertically disposed auxiliary fork having sides on which said portions of said main fork are slidable.

7. The structure set forth in claim 6, and vertically spaced springs on the sides of said auxiliary fork resisting upward and downward movement of said main fork.

8. In a motorcycle having a front wheel, a main fork straddling the front wheel and having portions disposed at either side thereof, main springs at the sides of said wheel and carried thereby, said springs being flexibly connected at their ends to said portions, and guide means for controlling said springs and holding said fork from sidewise movement relatively to the axle of said wheel.

9. In a motorcycle having a front wheel, a main fork arranged to straddle said wheel and having portions disposed respectively at either side thereof, leaf springs at the sides of said wheel and carried thereby, means flexibly connecting the ends of said springs to said portions respectively, means for guiding said fork in a vertical direction when said springs are flexed, auxiliary springs for supporting said fork and auxiliary springs for resisting upward movement of said fork relatively to the axle of said wheel.

10. In a motorcycle having a front wheel, a main fork having portions disposed respectively at each side of said wheel, a pair of main springs supporting said fork, means connecting said main springs to said wheel, a depending fork mounted for vertical sliding movement in said portions, said depending fork being connected at its lower end to the axle of said wheel, and auxiliary reversely acting springs associated with said depending fork to retain the same in normal position.

11. In a motorcycle having a front wheel, a main fork having forwardly and rearwardly extending portions disposed respectively at either side of said wheel, a pair of main springs flexibly connected at their ends to the ends of said portions respectively, means for guiding said main fork in a vertical direction when said springs are flexed, auxiliary springs for supporting said portions and resisting upward movement thereof relatively to the axle of said wheel when said first mentioned springs are flexed.

12. In a motorcycle having a front wheel, a main front fork comprising vertically spaced portions disposed at each side of said wheel, an auxiliary fork having sides mounted for vertical sliding movement in said portions, means connecting the lower end of said auxiliary fork to the axle of said wheel, said auxiliary fork having a cross bar at its upper end and shock absorbing springs disposed between said portions of said main fork and said cross bar.

13. In a motorcycle having a front wheel, a main front fork comprising vertically spaced portions disposed at each side of said wheel, an auxiliary fork having sides mounted for vertical sliding movement respectively in said portions, means connecting the lower end of said sides to the axle of said wheel, said fork having a cross bar connecting its sides at the upper end thereof, shock absorbing springs associated with said sides and disposed between the upper of said portions of the main fork and said cross bar and a supporting spring associated with said sides and disposed between said vertically spaced portions of said main fork.

14. In a motorcycle having a front wheel, a main front fork comprising forwardly and rearwardly extending portions disposed respectively at either side of said wheel, means connected to the axle of said wheel for resiliently supporting said fork, an auxiliary fork having sides mounted for vertical sliding movement respectively in said portions, means connecting the lower ends of said sides to the axle of said wheel, said auxiliary fork having a cross bar connecting the upper ends of said sides, shock absorbing springs surrounding said sides disposed between the upper of said portions of the main frame and said cross bar, and supporting springs about said sides disposed between said vertically spaced portions of said main frame.

15. In a motorcycle having a front wheel, a main front fork comprising spaced forwardly and rearwardly extending portions disposed respectively at the sides of said wheel, said portions having vertically spaced aligned apertured lugs, an auxiliary fork having sides mounted for vertical sliding movement in said lugs, and springs for supporting said main fork.

16. In a motorcycle having a front wheel, a main front fork having portions disposed respectively at each side of said wheel, main springs carried by said wheel and connected to said portions for supporting the same, vertically spaced aligned apertured lugs carried by said portions, an auxiliary fork having sides slidably movable in said lugs, means connecting lower end of said auxiliary fork to said wheel and coiled springs surrounding said sides and resisting upward and downward movement of said portions of the main frame.

17. In a motorcycle having a front wheel, a main fork having a head adapted to be rotatably mounted in said frame and having forwardly and rearwardly extending portions disposed at either side of said wheel adapted to be connected to supporting springs and a vertically disposed auxiliary fork adapted to be secured to the axle of said wheel on which said main fork is slidable.

18. In a motorcycle having a front wheel, a main fork having forwardly and rearwardly extending portions disposed respectively at each side of the front wheel, said portions comprising vertically spaced members and a vertically disposed auxiliary fork supported by said wheel and having side portions slidable in said members.

In testimony whereof I affix my signature.

ANDREW DURESEN.